United States Patent
Smadja

(10) Patent No.: US 6,621,930 B1
(45) Date of Patent: Sep. 16, 2003

(54) AUTOMATIC CATEGORIZATION OF DOCUMENTS BASED ON TEXTUAL CONTENT

(75) Inventor: Frank Smadja, Haifa (IL)

(73) Assignee: Elron Software, Inc., Burlington, MA (US)

( * ) Notice: Subject to any disclaimer, the term of this patent is extended or adjusted under 35 U.S.C. 154(b) by 574 days.

(21) Appl. No.: 09/635,714

(22) Filed: Aug. 9, 2000

(51) Int. Cl.$^7$ ............................ G06K 9/36; G06K 9/72; G06K 9/34; H04N 1/00; G06F 17/30

(52) U.S. Cl. ...................... 382/224; 382/176; 382/177; 382/180; 382/229; 382/282; 358/403; 358/405; 358/453; 358/462; 707/3; 707/6

(58) Field of Search ................................ 382/165, 159, 382/160, 174–176, 177, 179, 180, 187, 190, 191, 194, 199, 209, 217–220, 224, 226–229, 278, 282, 305, 306; 358/403, 405, 426.02, 452, 453, 462; 707/3, 4, 5, 6

(56) References Cited

U.S. PATENT DOCUMENTS

| | | | |
|---|---|---|---|
| 4,912,770 A | * 3/1990 | Seto et al. | 382/107 |
| 5,479,533 A | * 12/1995 | Tanaka | 382/161 |
| 5,581,630 A | * 12/1996 | Bonneau, Jr. | 382/116 |
| 5,978,620 A | * 11/1999 | Syeda-Mahmood | 399/84 |
| 5,995,953 A | * 11/1999 | Rindtorff et al. | 706/20 |

FOREIGN PATENT DOCUMENTS

WO   WO 00/26795 A1   5/2000

OTHER PUBLICATIONS

Hoch. "Using IR techniques for text classification in document analysis." *Proc. Ann. Internat. ACM–SIGIR Conf. Res. Dev. Info. Retrieval,* Berlin Springer, DE, Jul. 3, 1994 pp. 31–40.

Maarek et al. "Full text indexing based on lexical relations an application: Software libraries."*Proceedings of the International Conference on Research and Development in Information Retrieval.* (SIGIR) Cambridge, MA Jun. 25–28, 198; 12:198–206.

Roiger et al. "Selecting training instances for supervised classification." *ITESM* 1996 pp. 150–155.

Smadja. "Retrieving collocations from text: Xtract." *Computational Linguistics,* Cambridge, MA 1993; 19(1):143–177.

* cited by examiner

Primary Examiner—Bhavesh M. Mehta
Assistant Examiner—Yosef Kassa
(74) Attorney, Agent, or Firm—Lahive & Cockfield, LLP

(57) ABSTRACT

An electronic device automatically classifies documents based upon textual content. Documents may be classified into document categories. Statistical characteristics are gathered for each document category and these statistical characteristics are used as a frame of reference in determining how to classify the document. The document categories may be intersecting or non-intersecting. A neutral category is used to represent documents that do not fit into many of the other specified categories. The statistical characteristics for an input document are compared with those for the document category and for the neutral category in making a determination on how to categorize the document. This approach is extensible, generalizable and efficient.

41 Claims, 8 Drawing Sheets

AUTOMATIC CATEGORIZATION OF DOCUMENTS BASED ON TEXTUAL CONTENT

TECHNICAL FIELD

The present invention relates generally to categorization of content and more particularly to the automatic categorization of documents based upon textual content.

BACKGROUND OF THE INVENTION

A number of different techniques have been developed to help automatically classify documents into categories based upon their textual appearance. The techniques can be largely categorized into five categories: techniques based on phonemes characteristics, techniques based on statistics for n-grams, techniques based on statistics for keywords, rule-based techniques, and techniques based on semantic topics. These different categories of techniques will be discussed in more detail below.

These classification techniques are generally based on measures of relationships between object, such as "similarity" or "association." The measure of the relationship is designed to quantify the likeness among objects. For any given object, the object in a group is more like the other members of the group than it is an object outside the group.

Techniques based on phonemes characteristics examine phonemes in the document. A "phoneme" is a smallest significant phonetical unit in a language that can be used to distinguish one word from another. For example, the "p" in the word "pit" may be a phoneme. Certain prior art systems have used hidden markov models (HMMs) for phonemes to model language. One example of a system that used HMMs is U.S. Pat. No. 5,805,771, issued Sep. 8, 1998, to Muthusany, et al. This patent describes a language identification set that models phonemes using HMMs. The paper proposes several enhancements to traditional HMM based language identification systems, including a language independent acoustic model. This technique appears limited to the processing of phonemes.

U.S. Pat. No. 5,625,748, issued Apr. 29, 1997 to McDonough et al., concerns a method for discriminating topics from speech events. The method is based on a word/phrase spotter and topic classifier that is trained in topic dependent event frequencies.

N-gram based techniques examine n-grams to categorize documents. An "n-gram" is a letter sequence of length n. Such techniques have been shown to be useful for identifying the native language in which a document is written. A paper by Gregory Grefenstette, "Comparing Two Language Identification Schemes." Proceedings of the $3^{rd}$ International Conference on the Statistical Analysis of Textual Data, JADT'95, December 1995, describes an n-gram based technique. With this technique, statistics are gathered on three letter sequences known as trigrams, at the basic signatures for a language. The paper compares n-gram techniques and a keyword based technique and, as a result of the comparison, favors the n-gram technique.

U.S. Pat. No. 5,418,951, issued May. 23, 1995, to Damashek et al also discloses an n-gram technique. The Damashek patent describes a method of retrieving documents that concern similar semantic topics or documents that are written in similar languages. The method relies upon the creation of a letter N-gram array for each document.

U.S. Pat. No. 5,062,143 issued Oct. 29, 1991 to Schmitt also concerns an n-gram technique. The Schmitt patent describes a technique for identifying the language in which a document is written based upon statistical analysis of letter trigrams appearing in the document. The technique uses a simple threshold based on the number of matches to determine the identity of the language in which the document is written. The matches are made against a library of precompiled key sets for a number of different languages.

Techniques based on statistics of words gather statistical information regarding keywords within documents. These statistics are then subsequently used to categorize a document. For example, word frequencies may be utilized to categorize a document. The presence of one or more frequently occurring words in a document may serve as a fairly reliable indicator that the document is of a specified document category.

U.S. Pat. No. 5,182,708, issued Jan. 26, 1993 to Ejiri, discloses a method for classifying a document to one of several predefined categories on the basis of word frequency. The method pivots around statistical characteristics of constrained languages and unconstrained languages. These statistical characteristics enable the method to distinguish, for example, English spoken by a native speaker from English spoken by a speaker for which English is a second language and from programming language code.

Rule-based techniques employ rules to implement categorization. For example, a rule may indicate that if a document contains the word "byte," the document relates to computers. This approach requires human experts to encode intelligence in the form or rules into the system. The rules are then used to perform the categorization.

Techniques based on semantic topics exploit relationships between words and semantic topics in documents. The relationships are used to assign topics to documents based on the words that are used within the documents. The assignment of the topics is a form of categorization.

U.S. Pat. No. 5,687,364, issued Nov. 1, 1997 to Saund, et al, describes a method of learning relationships between words and semantic topics in documents. The method assigns topics to documents based upon the words used in the documents. The method learns topics of the training data and associates a list of words with each topics. At run time, based on the words used in the document, the system identifies the matching topics.

U.S. Pat. No. 5,873,056, issued Feb. 16, 1999 to Liddy, et al, describes methods for predicting a semantic vector that represents a document based on words contained within the document. The method relies upon lexical database and subject codes. Non ambiguous words are assigned subject codes. The remaining words in the document are disambiguated based on the examination of the frequency with which other subject codes appear. Topic assignment is also based on the frequency with which other subject codes appear.

SUMMARY OF THE INVENTION

The present invention provides an approach to categorizing documents that is highly efficient. In addition, the approach adopted by the present invention may be empirically adjusted to produce improved results in view of feedback. In one embodiment of the present invention, a neutral category is utilized that represents documents that are not encompassed by the other categories. In determining whether to place a document in a given category, a comparison is made whether document better fits into the neutral category or the given category. The present invention is generalizable enough to perform many different types of categorization. Moreover, the present invention is extensible and requires little or no manual work to add a category. Still further, the present invention can handle multiple unrelated categories.

In accordance with one aspect of the present invention, a method of categorizing a selected document based upon textual content is performed. In this method, the document categories are provided into which documents may be categorized. A lexicon of tokens is provided for training. The tokens are partitioned into partitions based on frequency of occurrence of the tokens in respective subsets of training materials for each document category. A metric of frequency of occurrence of the token in the selected document is calculated per document category for each token in the selected document. For each of the partitions of each of the categories, a deviation factor is calculated using the calculated metric of frequency of occurrence of the token in the selected document per document category. Each deviation factor identifies the extent of deviation of the calculated metric in the partition. For each category, the deviation factors for the partitions of the categories are used to determine whether the document is to be categorized in the document category. The tokens may take many forms but may be words in some embodiments. The selected document may be an electronic mail message, a word processing document, a document that contains computing instructions or any of a number of other types of documents.

In accordance with another aspect of the present invention, a method of categorizing an input document is performed on an electronic device. In this method, a neutral category is provided for documents that do not fit into any of the other document categories. For each word in the input documents and for each document category a difference is determined between a frequency with which the word occurs and the selected document and an average frequency that the word occurs in training documents for the document category. For each document category other than a neutral category, frequency z-scores of words in the input document are compared with frequency z-scores of the words in the training documents for the category and are also compared with frequency z-scores of the words in the training documents for the neutral category to determine whether the input document is to added to the document category.

BRIEF DESCRIPTION OF THE DRAWINGS

An illustrative embodiment of the present invention will be described below relative to the following figures.

DETAILED DESCRIPTION OF THE INVENTION

The illustrative embodiment of the present invention provides an automated categorization facility for categorizing documents based upon textual content using statistical techniques. The categorization facility trains on a set of training materials, such as documents. The training materials contain textual content suited for the categories. Separate sets of training materials may be provided for each category. Statistical information is gathered from the training materials for each of the categories. This statistical information is then applied in determining the category to which an incoming document is to be categorized.

The tool employed in the illustrative embodiment is trained not only for application-specific categories but also for a special category that is designated as the "neutral category." The neutral category is used as a reference for regular documents. Regular documents are those that are not supposed to fit into any of the other categories. In this regard, the neutral category serves as a "catch-all." The neutral category is employed to help determine whether a document should be added to a particular category or instead added to the neutral category.

The illustrative embodiment provides a number of advantages over conventional systems. The illustrative embodiment is able to categorize documents in both intersecting categories and in non-intersecting categories. The illustrative embodiment is easily extensible in that no manual work is required to add a new category. In particular, there is no need for a manual creation of a new category having established characteristics. The illustrative embodiment is also generalizable that it may apply to a number of different applications and to a number of different domains. The discussion below will set forth two applications. The first application is the identification of undesirable email or "SPAM." The second application is for identifying the presence of source code in a document.

The illustrative embodiment is highly efficient. Analysis performed by the inventors indicates a very high rate of successful categorization by the illustrative embodiment. The approach of the illustrative embodiment also produces few false hits (i.e., categorization of a document in a category that is not appropriate).

For purposes of clarity in the discussion below, it is helpful to define a few terms.

A "token" refers to a sequence of characters, such as a word or words, found in a document.

A "lexicon" is a list of tokens that have been chosen so that the tokens help distinguish one category from another.

A "document" refers to a self-contained logical unit of content. Examples of a document include a word-processing document, a hypertext document and the like.

A "category" refers to a logical division.

Figure 1:
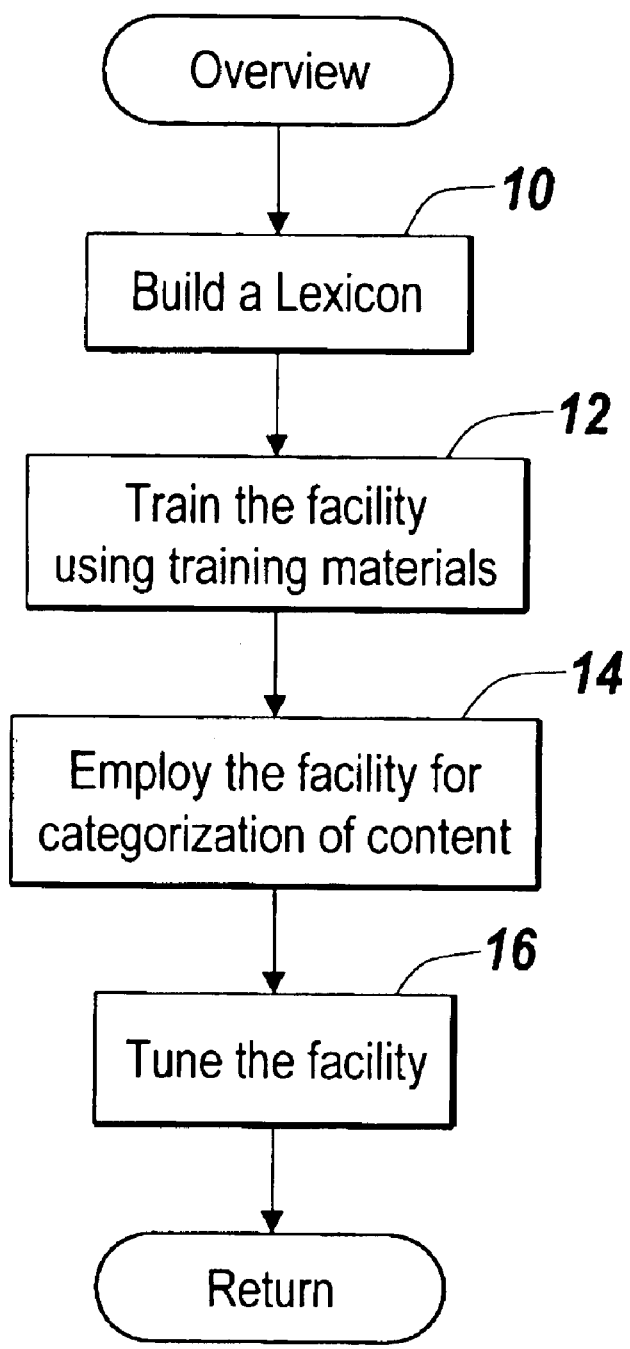
FIG. 1 is a flow chart that provides an overview of the steps performed in the illustrative embodiment of the present invention to categorize documents.

FIG. 1 is a flow chart that provides an overview of the steps performed in using the categorization facility of the illustrative embodiment of the present invention. Initially, a lexicon is built (step 10 in FIG. 1). As mentioned above, the lexicon contains a list of tokens, such as words, that have been chosen to help distinguish one category from the other. For example, for a baseball category, the lexicon might contain words such as "glove," "bat," and "single." The frequency with which the words on the lexicon occur in an incoming document help to determine what document category the incoming document is to be assigned.

The categorization facility of the illustrative embodiment is trained using training material (step 12 in FIG. 1). In the illustrative embodiment, the categorization facility uses training documents. Statistical characteristics of categories are derived from these training documents. The particulars of the statistical characteristics will be described in more detail below.

Once the categorization facility has been trained, the categorization facility may be employed for categorization of content (step 14 in FIG. 1). In the illustrative embodiment, the categorization facility acts on documents containing textual content. The textual content is examined to determine which document category is appropriate for the content.

Moreover, the content need not be limited strictly to textual content as described by the illustrative embodiment. The statistical techniques employed within the illustrative embodiment are equally applicable to other varieties of content, including but not limited to graphical content and audio content. In such instances, the tokens are not words but rather are graphical units or audio data units. The categorization facility may categorize the content into one or more categories. These categories may be overlapping or mutually exclusive.

The categorization facility may be tuned to optimize the results produced by the facility (step 16 in FIG. 1). In particular, certain thresholds (i.e., $T_1$ and $T_2$) may be adjusted by the user based on empirical results to obtain superior results when employing the categorization facility. These thresholds will be described below.

Figure 2:
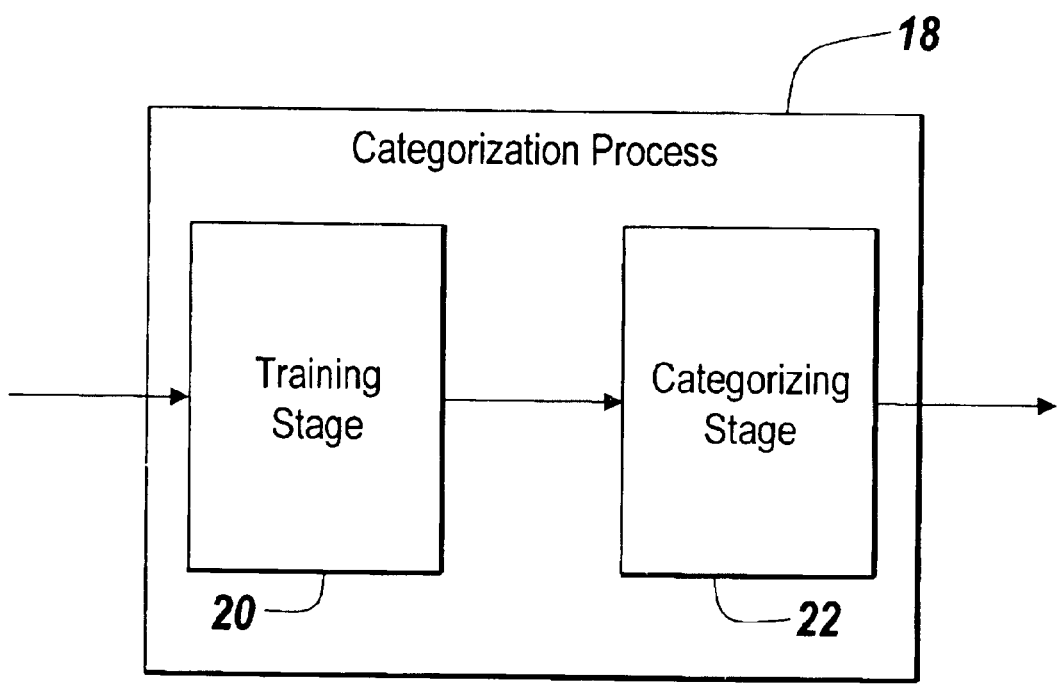
FIG. 2 illustrates the training stage and category stage of the categorization process.

As is apparent from the discussion above, the categorization process 18 (see FIG. 2) is a two-step process that includes a training stage 20 and a categorizing stage 22. In the training stage 20, statistical characteristics of categories are extracted, and in the categorizing stage 22, the statistical characteristics are employed to incoming content to appropriately categorize the incoming content.

Figure 3:
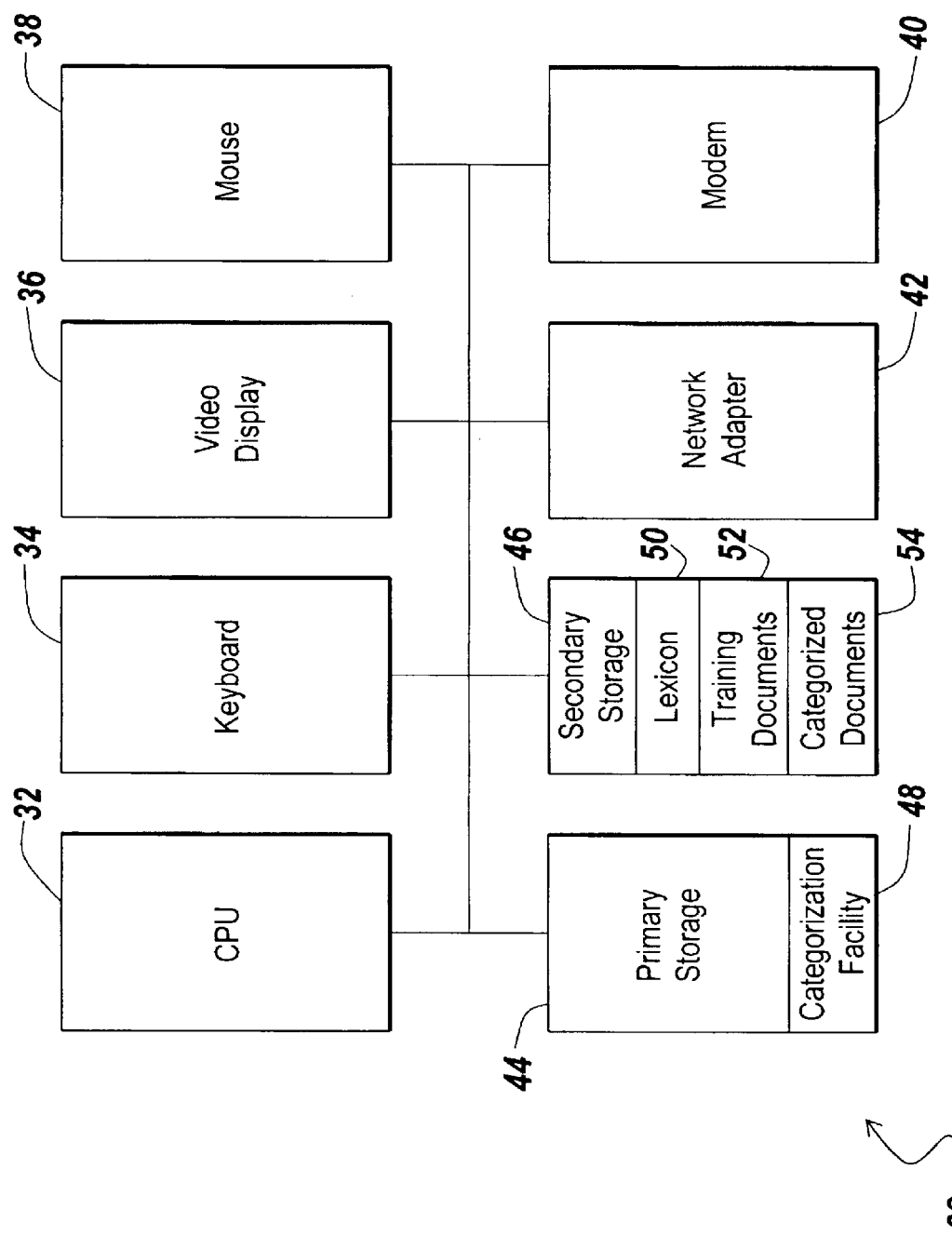
FIG. 3 is a block diagram illustrating a computer system that is suitable for practicing the illustrative embodiment.

The categorization facility of the illustrative embodiment may run on a computer system 30, such as that depicted in FIG. 3. Those skilled in the art will appreciate that the present invention may also be practiced on other types of electronic devices, including but not limited to Internet appliances, personal digital assistants (PDAs), network computers, and other varieties of intelligent appliances. The computer system 30 may be a server that provides access to a network, such as a local area network (LAN) the Internet, and intranet, an extranet or other type of network.

The computer system 30 depicted in FIG. 3, includes at least one central processing unit (CPU) 32. The CPU 32 may be implemented as any of a number of conventionally available microprocessors. The CPU 32 is responsible for executing instructions and directing activities within the computer system 30. The computer system 30 may include a number of input/output devices. For the configuration depicted in FIG. 3, the computer system 30 includes a keyboard 34, a video display 36 and a mouse 38.

The computer system 30 need not be a stand-alone device but rather may communicate with remote computing resources. To that end, the computer system 30 may include a modem 40. The modem may be a conventional data modem that communicates over analog telephone lines, a cable modem that communicates over cable lines or a wireless modem that communicates over wireless communication paths. The computer system 30 may also include a network adapter 42 for facilitating an interface with a computer network, such as a LAN.

The computer system 30 may include both primary storage 44 and secondary storage 46. The primary storage 44 may include a copy of the categorization facility 48 for execution by the CPU 32. A copy of the categorization facility 48 may also be held in secondary storage 46. The secondary storage may hold the lexicon 50, training documents 52 and categorized documents 54. The secondary storage 46 may be implemented in a number of different fashions including as a combination of different types of devices. For example, the secondary storage may include magnetic disk drives, optical disk drives and other types of storage media.

It should be appreciated that a lexicon 50 need not be a monolithic lexicon but rather may be composed of multiple lexicons.

It should also be appreciated that the categorized documents 54 need not be stored locally at the computer system 20 but rather may be stored at remote locations as needed.

Those skilled in the art will appreciate that the categorization facility 48 need not be implemented solely in software but rather may be implemented in firmware, hardware or a combination of software, firmware and hardware.

Figure 4:
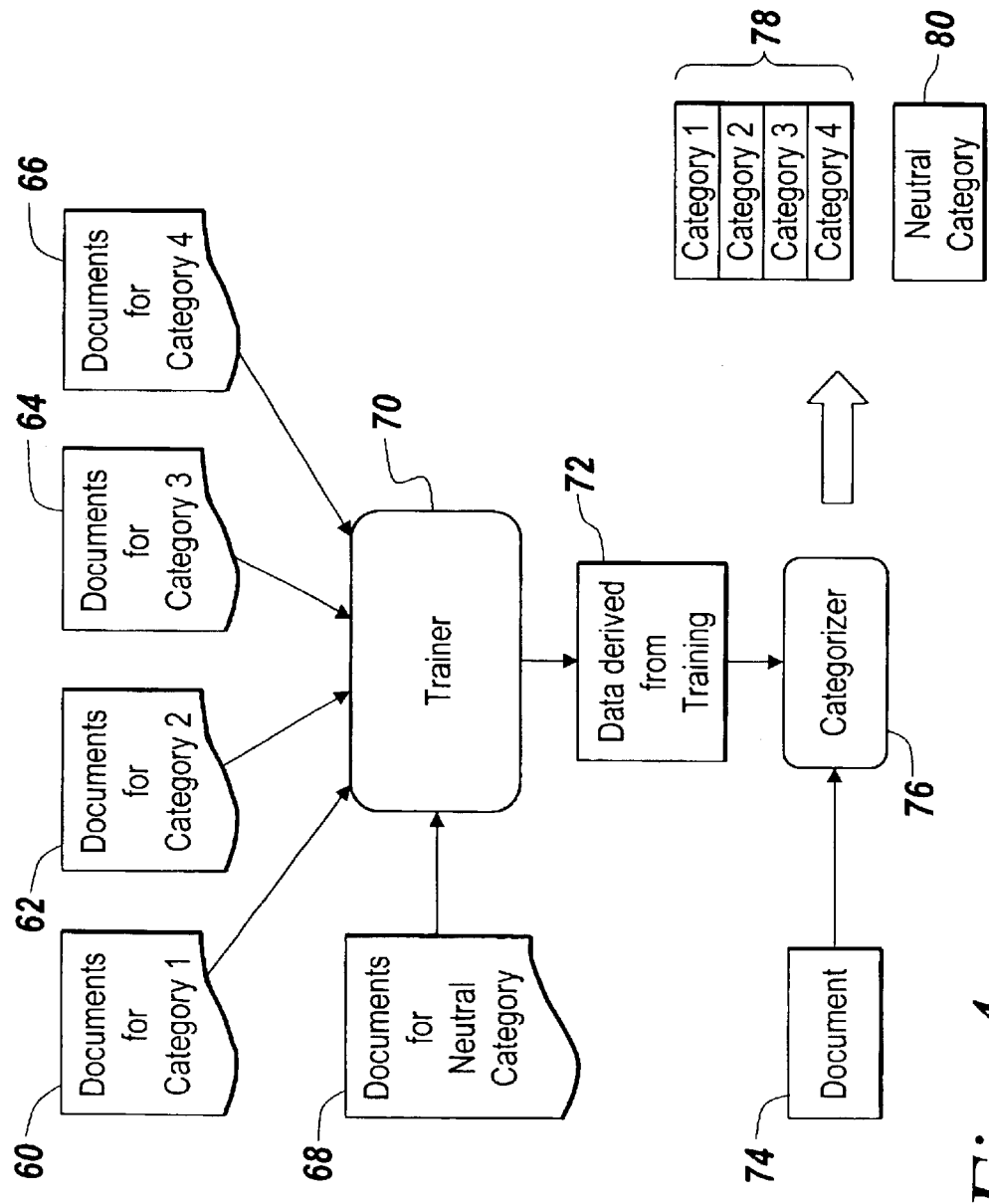
FIG. 4 illustrates functional components employed in the illustrative embodiment.

FIG. 4 provides an overview of the operation of the categorization facility 48 in the illustrative embodiment in categorizing a document. The categorization facility 48 includes a trainer 70 that is responsible for performing the training necessary to implement the categorization. The categorization facility 48 also includes a categorizer 76, which is responsible for determining the category or categories a document 74 is to be placed in. As can be seen in FIG. 4, the trainer 70 has document sets 60, 62, 64, 66 and 68 for respective categories. Each category has an associated document set that is used to appropriately train the trainer 70 so as to extract the statistical characteristics, which have been discussed above. The trainer 70 also processes documents for a neutral category 68. As was mentioned above, the neutral category represents a normal document that does not fit into the other categories (e.g. category 1, category 2, category 3 or category 4). The statistical characteristics or data that is derived from the training by the trainer 70 is employed by the categorizer 76. The categorizer 76 receives a document 74 and employs techniques to determine the categories in which to place the document. In the example shown in FIG. 4, the categories are the regular category 78 and the neutral category 80.

Figure 5:
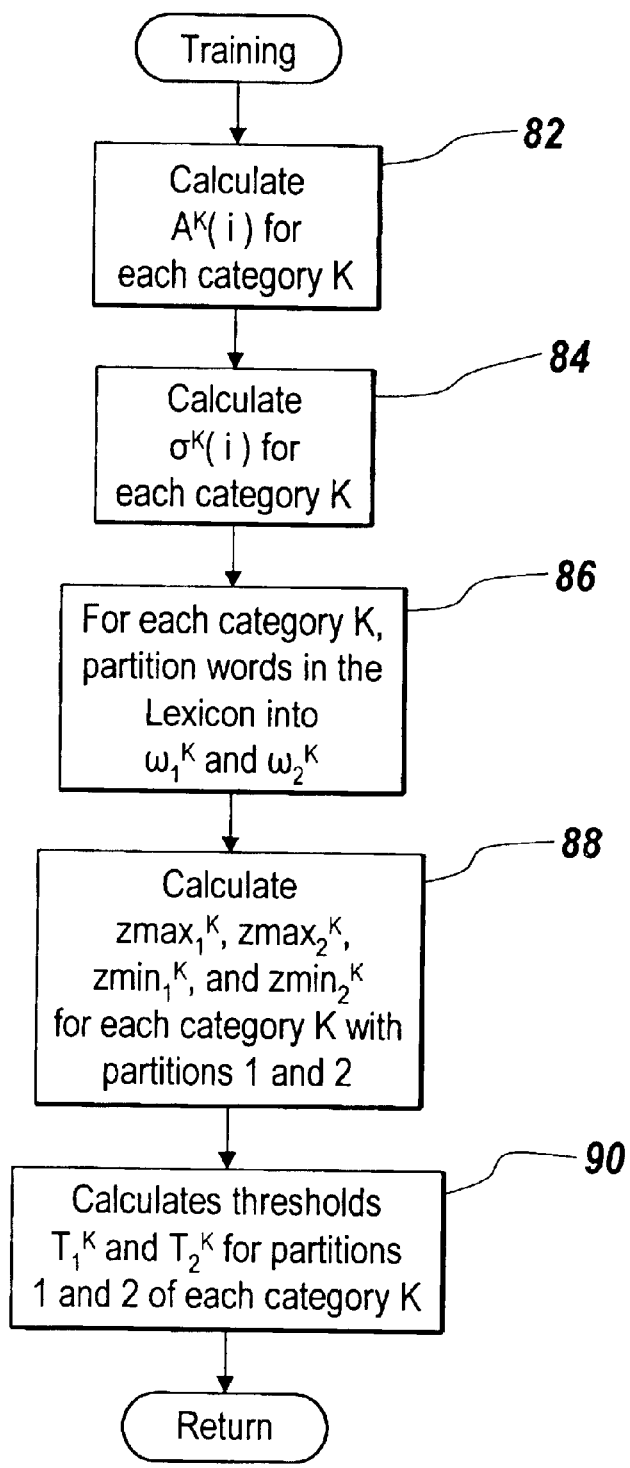
FIG. 5 is a flow chart illustrating steps that are performed during the training phase.

As has been mentioned above, the trainer 70 must perform training on training documents in order to properly configure the categorizer 76 so the categorizer is able to categorize the incoming documents. FIG. 5 is a flow chart illustrating the steps that are performed during the training period. Initially, the trainer 70 processes each of the training documents for the associated category to calculate the average frequency of occurrence of each word in the training collection across all of the training documents for the category (step 82 in FIG. 5). This average frequency is designated as $A^k(i)$ and is calculated as follows:

$$A^k(i) = \frac{\sum_{1 < j < J} F_j^k(w_i)}{J}$$

where k specifies the category;

i refers to an index of the word in the base lexicon;

$w_i$ refers to the $i^{th}$ word within the base lexicon;

J refers to the number of training document for the category;

j refers to the index of the training document amongst those provided for the category; and $F_j^k(w_i)$ refers to the frequency of occurrence of the word $w_i$ in the $j^{th}$ document used for the training category k.

$A^k(i)$ is calculated for each category k. For each word, this calculation specifies the average frequency of occurrence of the word in the training collection of documents.

The standard deviation in the frequency of each word $w_i$ among the training documents for each category k is calculated (step 84 in FIG. 5). The calculation of the standard deviation is as follows.

$$\sigma^k(i) = \sqrt{\frac{\sum_{1 \leq j \leq J}(F_j^k(w_i) - A^k(i))^2}{J}}$$

where $\sigma^k(i)$ is the standard deviation of the frequency of the word $w_i$ for category k across all the J training documents.

As is well known in statistical analysis, the standard deviation represents a measure of deviation or dispersal from an expected value. The standard deviation may be used as a measure of the volatility of a variable.

The lexicon W is partitioned into two partitions for each category k (step 86 in FIG. 5). The first partition is designated as $W_1^k$ and the second partition is designated as $W_2^k$. The first partition is specified as the intersection (i.e. $\Lambda$) of two subsets as follows.

$$W_1^k = \{w_i; (A^k(i) > 0) \Lambda (A^0(i) = 0)\}$$

where $A^0(i)$ refers to the frequency that the word $w_i$ occurs in the training documents for the neutral category.

The second partition is calculated as follows:

$$W_2^k = \{w_i; (A^k(i) > 0) \Lambda (A^0(i) > 0)\}$$

Thus, the first partition $W_1^k$ refers to the words in the lexicon that each occur at least once in the training documents for category k but do not occur in the training documents for the neutral category. The second partition refers to words that occur at least once in the training documents for category k and at least once in the training documents for the neutral category.

For each word in each partition of each category, a z-score of the frequency of the word for each training document in the given category is calculated. The z-score for an item expresses how and in what direction the item deviates from its distribution's mean. The z-scores are expressed in units of the standard deviation of the distribution. In the present case, the z-score is calculated for a given word $w_i$ and a given training document j in a category k, as follows:

$$Z_{i,j,k} = \frac{F_j^k(w_i) - A^k(i)}{\sigma^k(i)}$$

For each category, the maximum sum of all z-scores for all the words in the first partition of the category is calculated. More formally, the calculation is conducted as follows:

$$ZMAX_1^k = \underset{J \in W_1^k}{MAX}\left(\sum_{i < N}(Z_{i,j,k})\right)$$

The minimum sum of all z-scores for all words in the first partition of the category is also calculated as follows.

$$ZMIN_1^k = \underset{J \in W_1^k}{MIN}\left(\sum_{i < N}(Z_{i,j,k})\right)$$

In addition, the following calculations of maximum and minimum sums of z-scores for the second partition are performed.

$$ZMAX_2^k = \underset{J \in W_2^k}{MAX}\left(\sum_{i < N}(Z_{i,j,k} - Z_{i,j,0})\right)$$

$$ZMIN_2^k = \underset{J \in W_2^k}{MIN}\left(\sum_{i < N}(Z_{i,j,k} - Z_{i,j,0})\right)$$

In sum, $ZMAX_1^k$, $ZMAX_2^k$, $ZMIN_1^K$ and $ZMIN_2^k$ are calculated for each category k with partitions 1 and 2 (step 88 in FIG. 5).

In the final part of the training, thresholds are calculated for each partition (step 90 in FIG. 5). Threshold $T_1^k$ refers to a threshold for partition 1 of category k and threshold $T_2^k$ refers to the threshold for partition 2 of category k. The thresholds are parameters that will be used during the categorizing. These thresholds may be empirically derived and adjusted in the tuning step (see step 16 in FIG. 1).

Once training is complete, run-time categorization may be performed to process the input document 74 (FIG. 4) to determine the categories to which the input document should be placed. A z-score is calculated for the frequency of each token (e.g. word) in a document for each category (step 100 in FIG. 6). The z-score may be calculated as follows.

$$z^k(i) = \frac{Freq(w_i, Doc) - A^k(i)}{\sigma^k(i)}$$

Figure 6:
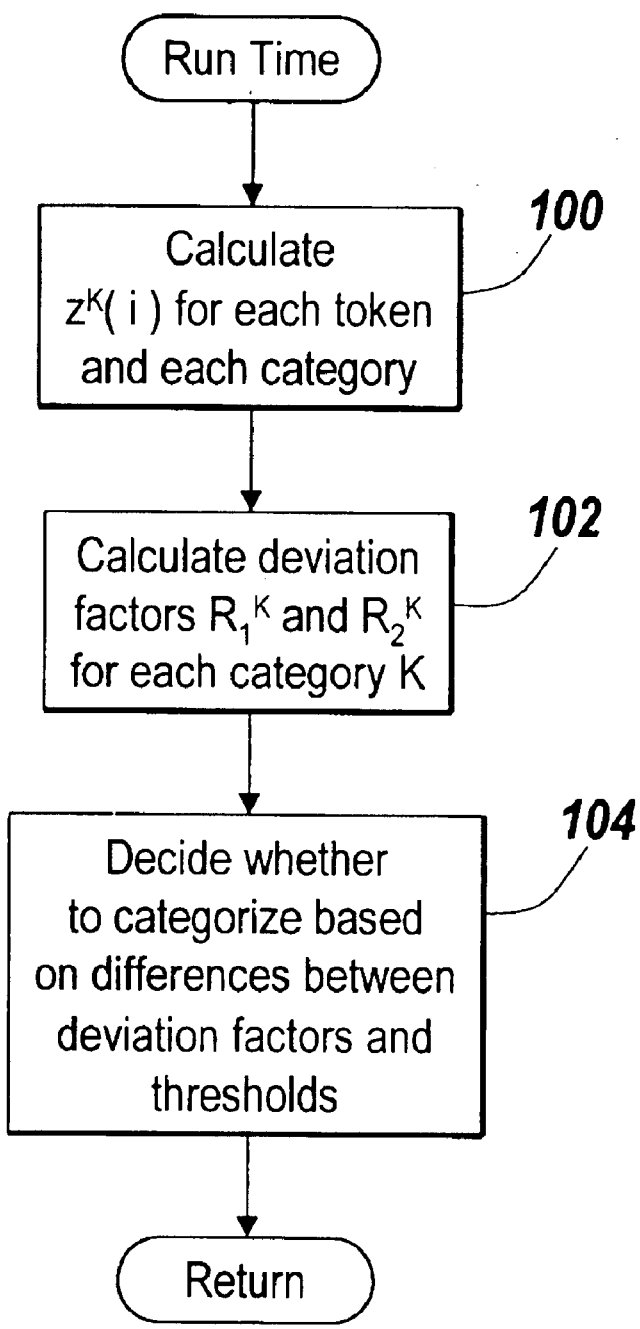
FIG. 6 is a flow chart illustrating steps that are performed during run time.

The categorizer 76 then calculates deviation factors for each partition of each category (i.e., $R_1^k$ and $R_2^k$) as follows (step 102 in FIG. 6).

$$R_1^k = MIN\left(100, \frac{\sum_{i \in W_1^K} z^k(i) - ZMIN_1}{ZMAX_1 - ZMIN_1}\right) \text{ and } R_2^k =$$

$$MIN\left(100, \frac{\sum_{i \in W_2^K}(z^k(i) - z^0(i)) - ZMIN_2}{ZMAX_2 - ZMIN_2}\right)$$

As can be seen from the above equation, the maximum and minimum sums of the z-scores that were calculated in the training stage are used to calculate the deviation factors. The z-scores that were calculated in step 100 of FIG. 6 are also employed in these calculations.

The resulting deviation values are then subtracted from the respective thresholds to determine whether the deviation factors are greater than the thresholds. In particular, a threshold $T_1^k$ is subtracted from the deviation factor from the first partition $R_1^k$ to determine whether the deviation factor is greater than the threshold. Similarly, the second threshold $T_2^k$ is subtracted from the deviation factor for the second partition $R_2^k$ to determine which is larger. The document is categorized into the associated category k in all instances except when both of the deviation factors are greater than their associated thresholds (step 104 in FIG. 6).

Figure 7:
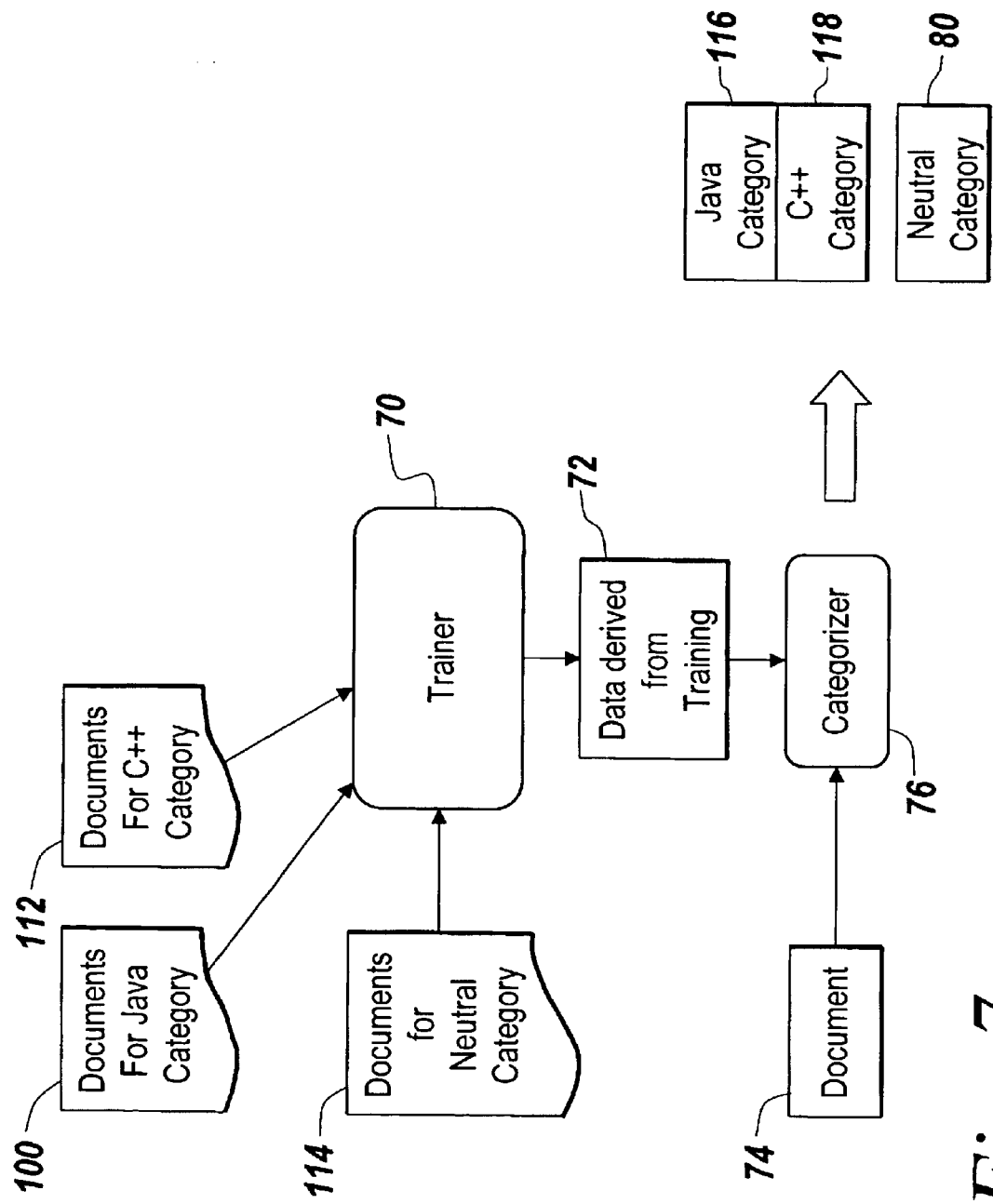
FIG. 7 illustrates functional components that are employed in an example case of categorizing a document that contains computer program instructions.

As was mentioned above, the illustrative embodiment may be used to determine whether a document contains computer program instructions for a given programming language. FIG. 7 shows an example of a system that is suitable for determining whether a document contains Java programming language instructions or C++ programming language instructions. In this case, the trainers trained using documents for a Java category 110 and documents for a C++ category 112. Furthermore, the trainer is trained using documents for a neutral category 114. The data drive from training 72 is used by the categorized 76 to categorize input document 74. The input document may be categorized in a Java category 116, a C++ category 118 or a neutral category 80 (i.e., not containing Java or C++ instructions).

Figure 8:
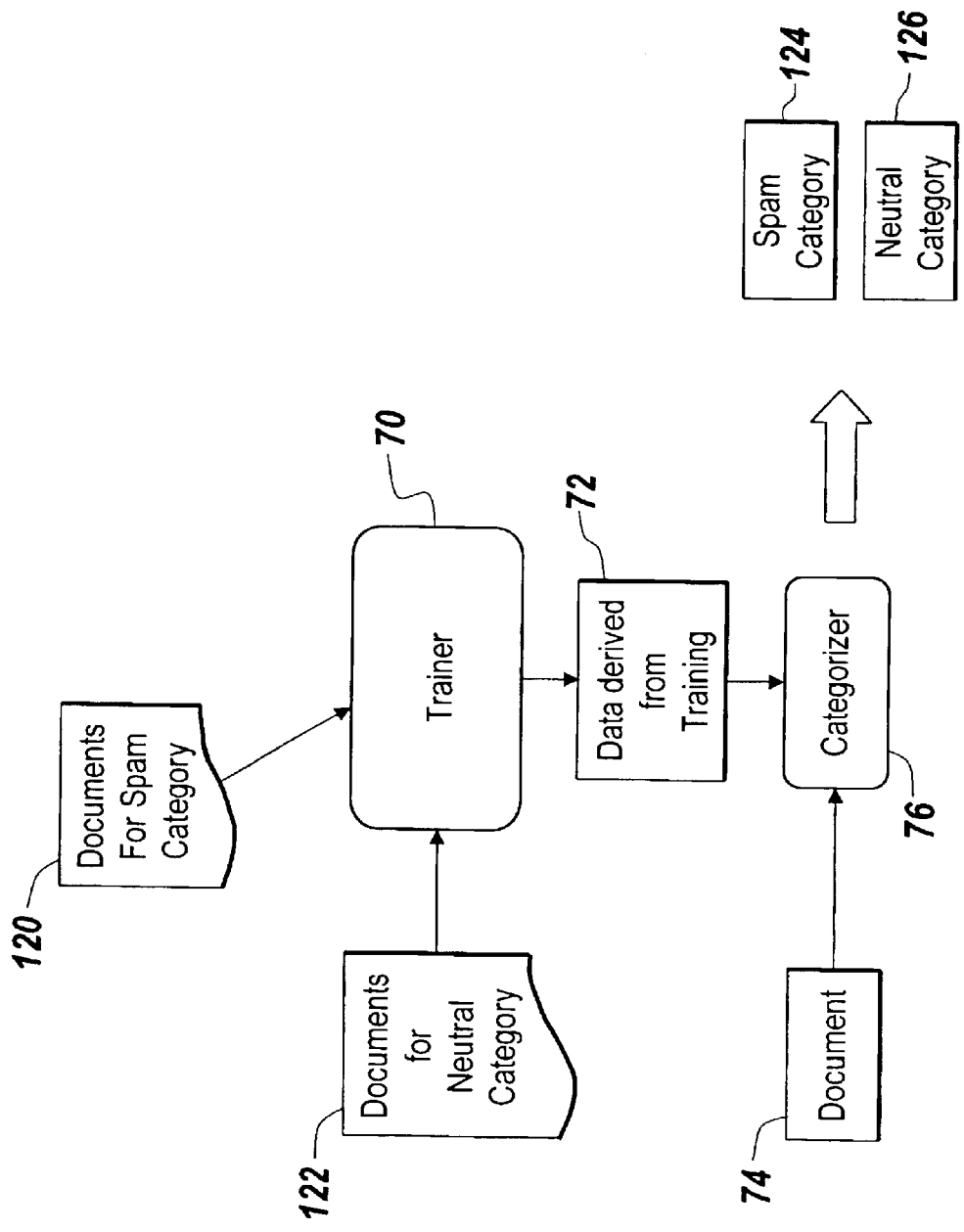
FIG. 8 illustrates the functional components that are employed in an example case where electronic mail messages are categorized as being SPAM or not.

As shown in FIG. 8, the illustrative embodiment may be used to distinguish normal electronic mail messages (email) from SPAM. In such a case, the trainer 70 is trained with documents for a SPAM category 120 and documents from a neutral category 122. The resulting data derived from training 72 is passed to categorizer 76. The categorizer categorizes the document 74 to either place it in the SPAM category 124 or the neutral category 126.

While the present invention has been described with reference to an illustrative embodiment thereof, those skilled in the art will appreciate that various changes in form and detail may be made without departing from the intended scope of the present invention as defined in the appended claims.

What is claimed is:

1. In an electronic device, a method of categorizing a selected document based on textual content, comprising the steps of:

providing document categories into which documents may be categorized;

providing a lexicon of tokens for training, wherein for each document category the tokens are partitioned into partitions based on frequency of occurrence of the tokens in respective subsets of training materials;

for each token in the selected document, calculating per document category a metric of frequency of occurrence of the token in the selected document;

for each of the partitions in each of the document categories, calculating a deviation factor using the calculated metric of frequency of occurrence of the token in the selected document per document category, wherein the deviation factor identifies an extent of deviation of the calculated metric in the partition; and for each document category, using the deviation factors for the partitions of the document category to determine whether the document is to be categorized as a document of the document category.

2. The method of claim 1, wherein the step of calculating the metric of frequency of occurrence of the token, comprises calculating a z-score from a frequency that the token occurs in the selected document, an average frequency that the token occurs in training materials for the category and a standard deviation of frequency of occurrence of the token in the training materials for the category.

3. The method of claim 1, wherein each token is a word.

4. The method of claim 1, wherein the selected document is an electronic mail message.

5. The method of claim 1, wherein the selected document contains computer programming instructions.

6. The method of claim 5, wherein the computer programming instructions are written in the C++ programming language.

7. The method of claim 5, wherein the computer programming instructions are written in the Java programming language.

8. The method of claim 1, wherein the deviation factors are calculated by comparing z-scores for frequency of occurrence of the token in the selected document with a z-score for frequency of occurrence of the token in a neutral category.

9. The method of claim 1, further comprising the step of calculating statistical elements for each of the partitions of each of the document categories by performing calculations on the training materials.

10. The method of claim 9, wherein the statistical elements are used in the step of calculating the metric of frequency of occurrence.

11. The method of claim 9, wherein the statistical elements include, for each token in the training materials for each of the document categories, an average frequency of the token across the training materials for the category.

12. The method of claim 9, wherein the statistical elements include, for each token in the training materials for each of the document categories, a standard deviation for a frequency of occurrence of the token in the training materials for the document category.

13. The method of claim 1 wherein at least two of the document categories are unrelated.

14. The method of claim 1 wherein a same document is categorized into at least two of the document categories.

15. The method of claim 1 wherein at least two of the document categories have no documents that are categorized in both document categories.

16. The method of claim 1 further comprising the steps of adding a new document category.

17. In an electronic device, a method categorizing an input document, comprising the steps of:

providing document categories into which the selected document may be categorized, said document categories including a neutral category for documents that do not fit into any of the document categories other than the neural category;

for each word in the input document and, for each document category;

(i) determining a difference between a frequency with which the word occurs in the selected document and an average frequency that the word occurs in training documents for the document category;

(ii) calculating a z-score for the word by dividing the determined difference by a standard deviation for frequency of occurrence of the word in the training documents for the document category; and for each document category other than the neutral category, comparing z-scores of words in the input document with z-scores of the words for the training documents for the category and z-scores for the words for the training documents for the neutral category to determine whether the input document is to be added to the document category.

18. The method of claim 17, wherein the method further comprises the step of providing a lexicon of words.

19. The method of claim 18, wherein the method further comprises the step of, for each document category other than the neutral category, partitioning the document category into a first partition of words in the lexicon that appear in the training documents for the document category but do not appear in the training documents for the neutral category and a second partition of words in the lexicon that appear in the training documents for the document category and appear in the training documents for the neutral category.

20. The method of claim 19, wherein the method further comprises the steps of:
for each document category,
(i) computing z-scores for a frequency of occurrence of words in the lexicon for the training documents for the document category;
(ii) calculating a maximum sum of the z-scores for the words in the first partition; and
(iii) calculating a minimum sum of the z-scores for the words in the first partition.

21. The method of claim 20, wherein the method further comprises the steps of:
for each document category,
(i) calculating a maximum sum of differences for each word in the second partition between a z-score for the word for the document category and a z-score for the word for the neutral category; and
(ii) calculating a minimum sum differences for each word in the second partition between a z-score for the word for the document category and a z-score for the word for the neutral category.

22. The method of claim 21, wherein the method further comprises the step of:
calculating a first deviation factor for the first partition of each document category, wherein the first deviation factor is a minimum of a first constant value and a first calculated value, and wherein the first calculated value is calculated by determining a first difference between a sum of z-scores for words in the document for the document category and the minimum sum of the z-scores for the words of the first partition and dividing the first difference by a second difference which is equal to a difference between the maximum sum of the z-scores for the words in the first partition and a minimum sum of the z-scores for the words in the first partition.

23. The method of claim 22, wherein the method further comprises the step of:
calculating a second deviation factor for the second partition for each document category and wherein the second deviation factor is a minimum of a second constant value and a second calculated value and wherein the second calculated value is calculated by determining a third difference between a sum, calculated for each word in the second partition as the z-score for the word for the document category minus the z-score for the words for the neutral category, and the minimum sum of the differences for each word in the second partition between the z-score for the word for the document category and the z-score for the word for the neutral category and dividing the third difference by a fourth difference, wherein the fourth difference is calculated by subtracting the minimum sum of the differences for each word in the second partition between the z-score for the words for the neutral category from the maximum sum of the differences for each word in the second partition between the z-score for the word for the document category and the z-score for the word for the neutral category.

24. The method of claim 22, wherein the determining of whether the input document is to be added to document category comprises comparing the deviation factor for the first partition of the document category to a first threshold and comparing the deviation factor for the second partition of the category to a second threshold.

25. A storage medium for use in an electronic device holding instructions for performing a method of categorizing a selected document based on textual content, comprising the steps of:
providing document categories into which documents may be categorized;
providing a lexicon of tokens for training, wherein for each document category the tokens are partitioned into partitions based on frequency of occurrence of the tokens in respective subsets of training materials;
for each token in the selected document, calculating per document category a metric of frequency of occurrence of the token in the selected document;
for each of the partitions in each of the document categories, calculating a deviation factor using the calculated metric of frequency of occurrence of the token in the selected document per document category, wherein the deviation factor identifies an extent of deviation of the calculated metric in the partition; and
for each document category, using the deviation factors for the partitions of the document category to determine whether the document is to be categorized as a document of the document category.

26. The storage medium of claim 25, wherein the step of calculating the metric of frequency of occurrence of the token, comprises calculating a z-score from a frequency that the token occurs in the selected document, an average frequency that the token occurs in training materials for the document category and a standard deviation of frequency of occurrence of the token in the training materials for the category.

27. The storage medium of claim 25, wherein each token is a word.

28. The storage medium of claim 25, wherein the selected document is an electronic mail message.

29. The storage medium of claim 25, further comprising the step of calculating statistical elements for each of the partitions of each of the categories by performing calculations on the training materials.

30. The storage medium of claim 29, wherein the statistical elements are used in the step of calculating the metric of frequency of occurrence.

31. The storage medium of claim 29, wherein the statistical elements include, for each token in the training materials for each of the categories, an average frequency of the token across the training materials for the document category.

32. The storage medium of claim 29, wherein the statistical elements include, for each token in the training materials for each of the categories, a standard deviation for a frequency of occurrence of the token in the training materials for the document category.

33. The storage medium of claim 29, wherein the deviation factors are calculated by comparing z-scores for frequency of occurrence of the token in the selected document with a z-score for frequency of occurrence of the token in a neutral category.

34. The storage medium of claim 25 wherein at least two of the document categories are unrelated.

35. The storage medium of claim 25 wherein a same document is categorized into at least two of the document categories.

36. The storage medium of claim 25 wherein at least two of the document categories have no documents that are categorized in both categories.

37. The storage medium of claim 25 wherein the method further comprises adding a new document category.

38. A storage medium for use in an electronic device holding instructions for performing, a method categorizing an input document, comprising the steps of:
provviding document categories into which the selected document may be categorized, said document categories including a neutral category for documents that do not fit into any of the document categories other than the neural category;
for each word in the input document and, for each document category;
(i) determining a difference between a frequency with which the word occurs in the selected document and an average frequency that the word occurs in training documents for the document category;
(ii) calculating a z-score for the word by dividing the determined difference by a standard deviation for frequency of occurrence of the word in the training documents for the document category; and
for each document category other than the neutral category, comparing z-scores of words in the input document with z-scores of the words for the training documents for the category and z-scores for the words for the training documents for the neutral category to determine whether the input document is to be added to the document category.

39. An electronic device for categorizing an input document, comprising
means for providing document categories into which documents may be categorized;
means for providing a lexicon of tokens for training, wherein for each document category the tokens are partitioned into partitions based on frequency of occurrence of the tokens in respective subsets of training materials;
for each token in the selected document, means for calculating per document category a metric of frequency of occurrence of the token in the selected document;
for each of the partitions in each of the document categories, means for calculating a deviation factor using the calculated metric of frequency of occurrence of the token in the selected document per document category, wherein the deviation factor identifies an extent of deviation of the calculated metric in the partition; and
for each document category, means for using the deviation factors for the partitions of the document category to determine whether the document is to be categorized as a document of the document category.

40. The electronic device of claim 39, wherein the device is a computer system.

41. The electronic device of claim 39, wherein the device is a personal digital assistant (PDA).

* * * * *